United States Patent
Yamaguchi

(10) Patent No.: US 10,620,433 B2
(45) Date of Patent: Apr. 14, 2020

(54) HEAD-UP DISPLAY DEVICE

(71) Applicant: TOPPAN PRINTING CO., LTD., Tokyo (JP)

(72) Inventor: Minoru Yamaguchi, Hino (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/216,308

(22) Filed: Dec. 11, 2018

(65) Prior Publication Data
US 2019/0227307 A1    Jul. 25, 2019

(30) Foreign Application Priority Data
Jan. 19, 2018  (JP) ................. 2018-007235

(51) Int. Cl.
| | | |
|---|---|---|
| G02F 1/1335 | (2006.01) | |
| G02B 27/01 | (2006.01) | |
| G02F 1/13357 | (2006.01) | |
| G02F 1/1368 | (2006.01) | |

(52) U.S. Cl.
CPC ... *G02B 27/0101* (2013.01); *G02F 1/133536* (2013.01); *G02B 2027/013* (2013.01); *G02B 2027/0118* (2013.01); *G02B 2027/0141* (2013.01); *G02F 1/1368* (2013.01); *G02F 1/133603* (2013.01); *G02F 2001/133531* (2013.01); *G02F 2001/133628* (2013.01)

(58) Field of Classification Search
CPC ............... G02B 27/0101; G02F 1/133536
See application file for complete search history.

(56) References Cited

U.S. PATENT DOCUMENTS

| | | | |
|---|---|---|---|
| 2013/0188259 A1 | 7/2013 | Nakamura et al. | |
| 2013/0279016 A1 | 10/2013 | Finger | |
| 2015/0226965 A1* | 8/2015 | Kim ................... | G02B 27/0101 359/463 |
| 2016/0109714 A1 | 4/2016 | Chen | |
| 2016/0216553 A1 | 7/2016 | Otani | |
| 2018/0067311 A1 | 3/2018 | Yokota et al. | |
| 2018/0348515 A1* | 12/2018 | Kuzuhara ............. | B60K 35/00 |

FOREIGN PATENT DOCUMENTS

| | | |
|---|---|---|
| JP | 4941070 | 5/2012 |
| JP | 2015-11212 | 1/2015 |
| WO | WO 2015/122491 A1 | 8/2015 |
| WO | WO 2016/181796 A1 | 11/2016 |

OTHER PUBLICATIONS

German Office Action dated Jun. 25, 2019 in corresponding German Patent Application No. 10 2018 131 804.9.

* cited by examiner

Primary Examiner — James A Dudek

(57) ABSTRACT

A head-up display device includes: a first light source unit; a first liquid crystal panel that includes a first liquid crystal layer configured to transmit a light from the first light source unit, and a first polarizer; a reflective polarizer that is arranged on an optical axis of the first light source unit, and includes both a first face receiving the light transmitting the first liquid crystal panel and a second face on a side opposite to the first face; a second light source unit configured to emit a light towards the second face of the reflective polarizer; and a second liquid crystal panel that includes a second liquid crystal layer configured to transmit the light from the second light source unit, and a second polarizer.

10 Claims, 6 Drawing Sheets

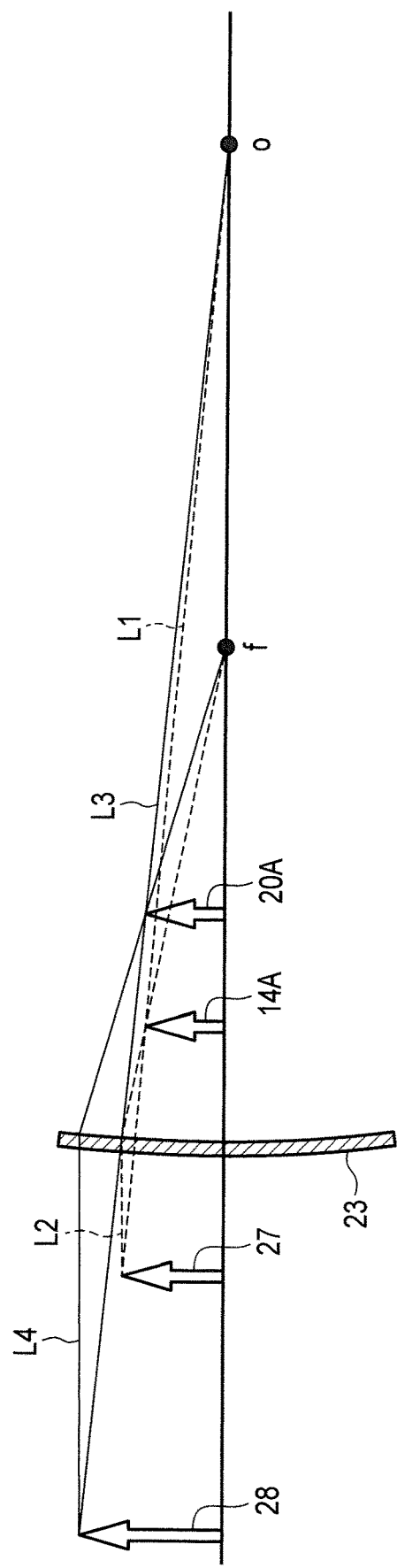
F I G. 4

HEAD-UP DISPLAY DEVICE

CROSS-REFERENCE TO RELATED APPLICATIONS

This application is based upon and claims the benefit of priority from Japanese Patent Application No. 2018-007235, filed Jan. 19, 2018, the entire contents of which are incorporated herein by reference.

FIELD

The present invention relates to a head-up display device such as a head-up display device that uses a liquid crystal display.

BACKGROUND

Head-up displays (HUDs) are widely known to be used in vehicles as information providing means. Such Head-up displays can superimpose the foreground of a front visual field across a vehicle's window shield to display different sorts of driving information as virtual images (for example, speed display, navigation display, etc.).

Head-up displays cause virtual images to appear, for example, in a location about 3 m in front of the driver's seat. Techniques have been made public on how to make such virtual images appear in multiple locations (Japanese Patent No. 4941070, Jpn Pat. Appl. KOKAI Publication No. 2015-11212).

SUMMARY

According to an aspect of the present invention, there is provided a head-up display device comprising:
a first light source unit;
a first liquid crystal panel that includes a first liquid crystal layer configured to transmit a light from the first light source unit, and a first polarizer configured to polarize the light transmitting the first liquid crystal layer;
a reflective polarizer that is arranged on an optical axis of the first light source unit, includes both a first face receiving the light transmitting the first liquid crystal panel and a second face on a side opposite to the first face, and includes both a transmission axis and a reflection axis;
a second light source unit configured to emit a light towards the second face of the reflective polarizer; and
a second liquid crystal panel that includes a second liquid crystal layer configured to transmit the light from the second light source unit, and a second polarizer configured to polarize the light transmitting the second liquid crystal layer,
wherein the optical axis of the first light source unit is at a slant to a normal of the reflective polarizer,
an optical axis of the second light source unit is at a slant to the normal of the reflective polarizer,
a transmission axis of the first polarizer is parallel to the transmission axis of the reflective polarizer, and
a transmission axis of the second polarizer is parallel to the reflection axis of the reflective polarizer.

BRIEF DESCRIPTION OF THE DRAWINGS

FIG. 4 is a pattern diagram describing operations of a head-up display device.

DETAILED DESCRIPTION

A description will now be given of the embodiments with reference to the accompanying drawings. It should be noted that the drawings are schematic or conceptual, and the dimensions and scales of the drawings are not necessarily the same as the actual products. Where the same portion is depicted in different drawings, the dimensions and scale of one drawing may be different from those of another. Several embodiments described below merely show exemplary apparatuses and methods that implement the technical ideas of the present invention. The technical ideas are not limited by the element shapes, structures, arrangements etc. described below. In the description below, structural elements having substantially the same functions and configurations will be denoted by the same reference symbols, and a repetitive description of such elements will be given only where necessary.

First Embodiment

[1] Structure of Head-Up Display Device

Figure 1:
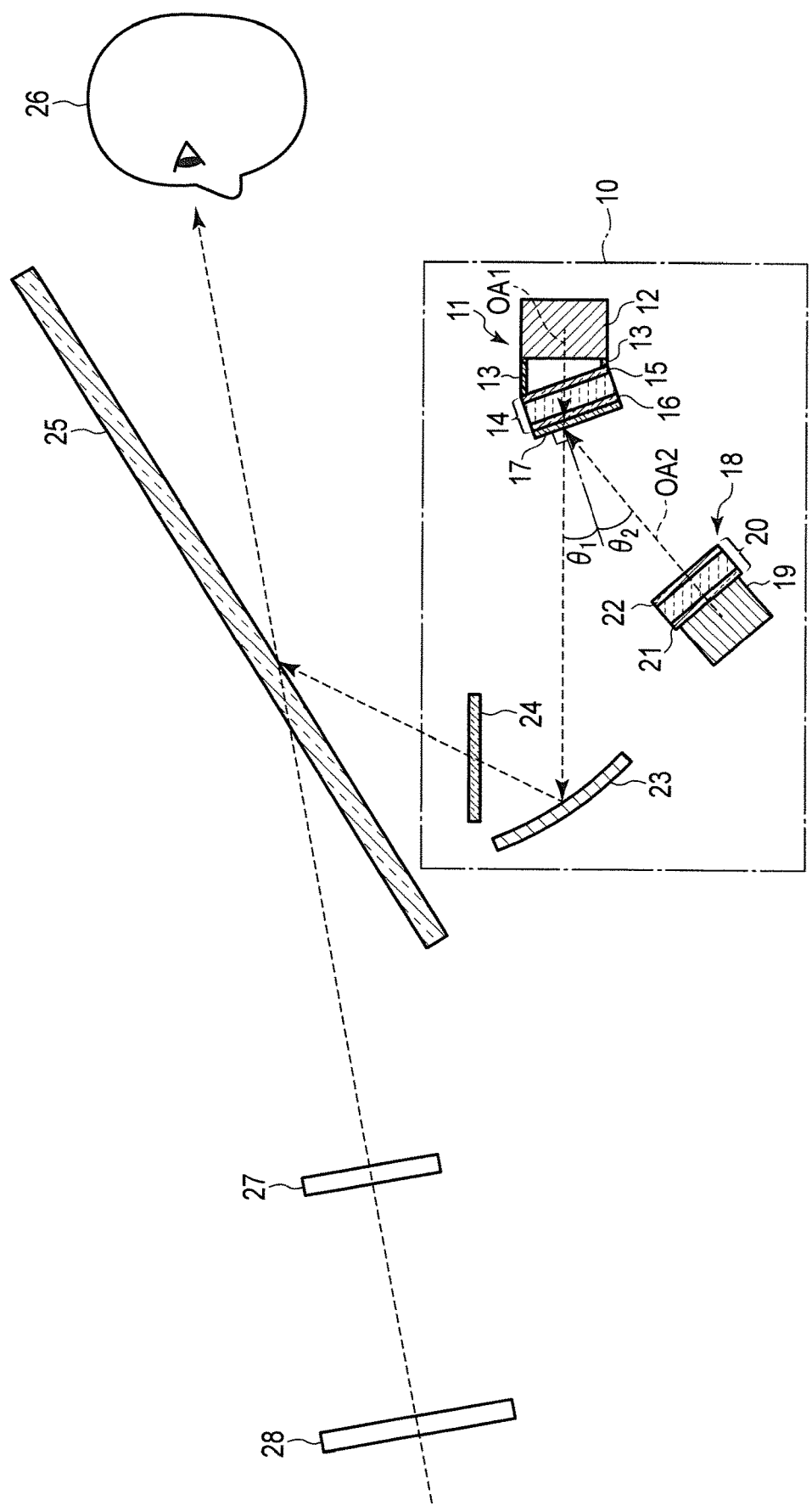
FIG. 1 is a cross-sectional view of a head-up display device according to a first embodiment of the present invention.

FIG. 1 is a cross-sectional view of a head-up display device 10 in a first embodiment of the present invention. The head-up display device 10 comprises a first liquid crystal display 11, a reflective polarizer 17, a second liquid crystal display 18, a reflecting member 23, and a retardation plate 24. The first liquid crystal display 11, the reflective polarizer 17, the second liquid crystal display 18, the reflecting member 23, and the retardation plate 24 are fixed in specific locations (the locations shown in FIG. 1) by fixing members (not shown) that are mounted to a case (not shown) that encloses almost the entire head-up display device 10.

The first liquid crystal display 11 comprises a first light source unit (back light) 12, a supporting member 13, and a first liquid crystal panel 14. The first liquid crystal panel 14 comprises a polarizer 15 arranged on the side of the first light source unit 12 and a polarizer 16 arranged on the opposite side of the first light source unit 12.

The first light source unit, 12 includes a light source having, for example, the shape of a flat plane (surface light source), and it emits an illumination light toward the first liquid crystal panel 14. The dashed arrow OA1 shown in FIG. 1 originating from the first light source unit 12 indicates the path of the light (optical axis) that is emitted from the first light source unit 12.

The supporting member 13 is in contact with both the first light source unit 12 and the first liquid crystal panel 14 and fixes the first light source unit 12 and the first liquid crystal panel 14. The supporting member 13 fixes the first light source unit 12 and the first liquid crystal panel 14 in such way that the optical axis OA1 of the first light source unit 12 and the normal of the first liquid crystal panel 14 are at a slant. The dashed-dotted line shown in FIG. 1 indicates the normal of the first liquid crystal panel 14 and the normal of the reflective polarizer 17. The supporting member 13 is formed, for example, along the surrounding edge of the first light source unit 12, and consists of a rectangular frame in plane shape (when viewed in the plan view). The supporting members 13 are constituted of, for example, a resin.

The normal of the first liquid crystal panel 14 is arranged at a slant below the optical axis OA1 of the first light source unit 12. In other words, angle $\theta_1$ between the normal of the first liquid crystal panel 14 and the optical axis OA1 of the first light source unit 12 is greater than 0° and less than 90°. More preferably, the angle $\theta_1$ between the normal of the first liquid crystal panel 14 and the optical axis OA1 of the first light source unit 12 is greater than 5° and less than 35°. The normal of the first liquid crystal panel 14 describes the normal to the display surface of the first liquid crystal panel 14. The optical axis OA1 of the first light source unit 12 is parallel to the normal to the light-emitting surface of the first light source unit 12.

The first liquid crystal panel 14 passes and modulates the illumination light from the first light source unit 12, and displays the images that show the driving information such as the vehicle speed etc. The driving modes of the first liquid crystal panel 14 are not limited to specific ones. It is viable to use a TN (twisted nematic) mode, a VA (vertical alignment) mode, or a homogeneous mode etc. A mode of the first liquid crystal panel 14 may also be a normally black mode (mode in which the light transmittance or luminance when switched off is lower than when switched on) or a normally white mode (mode in which the light transmittance or luminance when switched off is greater than when switched on).

Each of the polarizers 15, 16 has a transmission axis and an absorption axis that are orthogonal to each other in the plane. Among the light having a vibration plane in a random direction, the polarizers 15, 16 pass the light having a unidirectional vibration plane parallel to the transmission axis, in other words, a linearly polarized light (linearly polarized light element). The polarizers 15, 16 are, for example, brought into the crossed Nicols position in a way that their transmission axes are orthogonal to each other. The relationship between the transmission axes of the polarizers 15, 16 can be set discretionally according to their liquid crystal modes.

The reflective polarizer 17 is arranged in parallel to the first liquid crystal panel 14. The normal of the reflective polarizer 17 is parallel to the normal of the first liquid crystal panel 14. In other words, the normal of the first liquid crystal panel 14 and the normal of the reflective polarizer 17 are synonymous. For example, the reflective polarizer 17 is adhered to the first liquid crystal panel 14. The reflective polarizer 17 has a transmission axis and a reflection axis that are orthogonal to each other in the plane. Among the light having a vibration plane in a random direction, the reflective polarizer 17 passes the linearly polarized light (linearly polarized light element) that has a vibration plane parallel to the transmission axis, and reflects the linearly polarized light (linearly polarized light element) that has a vibration plane parallel to the reflection axis. The transmission axis of the reflective polarizer 17 is set in parallel to the transmission axis of the polarizer 16 in the first liquid crystal panel 14. In this manner, the reflective polarizer 17 passes the light (display light) emitted from the first liquid crystal panel 14.

The second liquid crystal display 18 comprises a second light source unit (back light) 19 and a second liquid crystal panel 20. The second liquid crystal panel 20 comprises a polarizer 21 arranged on the side of the second light source unit 19 and a polarizer 22 arranged on the opposite side of the second light source unit 19.

The second light source unit 19 includes, for example, a light source having the shape of a flat plane (surface light source), and emits an illumination light toward the second liquid crystal panel 20. The dashed arrow OA2 shown in FIG. 1 originating from the second light source unit 19 indicates the path of the light (optical axis) emitted from the second light source unit 19.

The second liquid crystal panel 20 passes and modulates the illumination light from the second light source unit 19. The optical axis OA2 of the second light source unit 19 is parallel to the normal of the second liquid crystal panel 20. The normal of the second liquid crystal panel 20 describes the normal to the display surface of the second liquid crystal panel 20. The optical axis OA2 of the second light source unit 19 is parallel to the normal to the light-emitting surface of the second light source unit 19. The second liquid crystal panel 20 displays the images that show the driving information such as the vehicle speed etc. Similar to the first liquid crystal panel 14, the driving modes of the second liquid crystal panel 20 are not limited to specific ones, and it is viable to use a TN mode, a VA mode, or a homogeneous mode. A mode of the second liquid crystal panel 20 may also be a normally black mode or a normally white mode.

The polarizers 21, 22 are, for example, brought into the crossed Nicols position in a way that their transmission axes are orthogonal to each other. The relationship between the transmission axes of the polarizers 21, 22 can be set discretionally according to their liquid crystal modes. The transmission axis of the polarizer 22 in the second liquid crystal panel 20 is arranged in parallel to the reflection axis of the reflective polarizer 17. In other words, the transmission axis of the polarizer 22 in the second liquid crystal panel 20 is set orthogonal to the transmission axis of the polarizer 16 in the first liquid crystal panel 14.

The second liquid crystal panel 20 faces the reflective polarizer 17 (or the first liquid crystal panel 14), and is arranged at a slant below the normal of the reflective polarizer 17. The second liquid crystal panel 20 is arranged in a way that the light emitted from the second liquid crystal panel 20 (display light) enters the reflective polarizer 17 at a slant. In other words, angle $\theta_2$ between the normal of the reflective polarizer 17 and the optical axis OA2 of the second light source unit 19 is greater than 0° and less than 90°. More preferably, the angle $\theta_2$ between the normal of the reflective polarizer 17 and the optical axis OA2 of the second light source unit 19 is greater than 5° and less than 35°. The angle $\theta_2$ between the normal of the reflective polarizer 17 and the optical axis OA2 of the second light source unit 19 is equal to the aforementioned angle $\theta_1$ between the normal of the first liquid crystal panel 14 and the optical axis OA1 of the first light source unit 12. In this manner, the reflective polarizer 17 is capable of reflecting the light emitted from the second liquid crystal panel 20 (display light) in a direction other than the optical axis OA2 of the second light source unit 19.

The reflecting member (reflection mirror) 23 is arranged on the optical axis OA1 of the first light source unit 12. The reflecting member 23 includes a concave mirror, a flat mirror or the like. The reflecting member 23 reflects the display light from the first liquid crystal display 11 and the second liquid crystal display 18 towards a display member 25. By using the concave mirror as the reflecting member 23, it is possible to magnify the display light from the liquid crystal display by a predetermined magnifying factor.

The retardation plate 24 is arranged on the axis of the light reflected by the reflecting member 23. The retardation plate 24 transforms the incident light into a circularly polarized light or an elliptically polarized light. The retardation plate 24 has a refraction index anisotropy, and has a slow axis and a fast axis that are orthogonal to each other in the plane. For example, the retardation plate 24 has the function of providing a predetermined retardation (where $\lambda$ is defined as the wavelength of the passing light, the phase difference is $\lambda/4$) between the light of predetermined wavelength that has passed through the slow axis and the light of predetermined wavelength that has passed through the fast axis. The retardation plate 24 consists of, for example, a $\lambda/4$ plate (¼ wavelength plate). The display light that is reflected by the reflecting member 23 passes the retardation plate 24. Note that the retardation plate 24 may be arranged between the reflecting member 23 and the reflective polarizer 17.

The display member 25 is used for projecting the display light from the first liquid crystal display 11 and the second liquid crystal display 18. As the driver (viewer) 26 views the display light reflected at the display member 25, he can visually recognize virtual images 27, 28 on the display member 25. Such information for the driver 26 to view as virtual images 27, 28 may, for example, be the vehicle speed, the rotational speed of the engine, the travel distance, any navigational information, the outside temperature etc.

The display member 25 is the vehicle's window shield, and may be a dedicated translucent (or transparent) screen (combiner) for the head-up display device 10. The combiner is arranged, for example, on the vehicle's instrument panel (also called the front panel or dashboard), fixed on the room mirror arranged in front of the driver 26, or fixed to the sun visor provided in the upper part of the window shield. The combiner includes, for example, a plate-shaped base that has a curved surface and is made of a composite resin. An evaporated film made of titanium oxide, silicon oxide or the like is formed on the surface of the base. The evaporation film imparts the translucence function to the combiner.

[1-1] Structures of First Light Source Unit 12 and Second Light Source Unit 19

Figure 2:
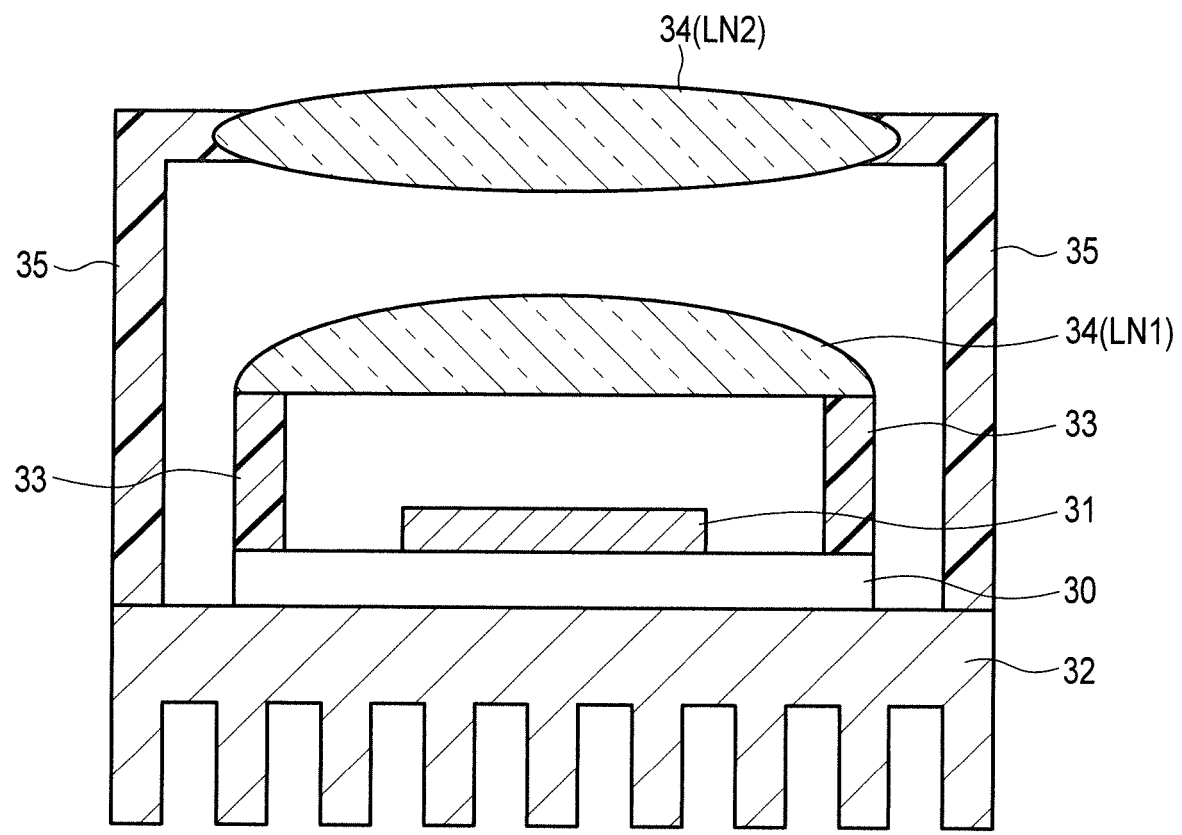
FIG. 2 is a cross-sectional view of a first light source unit.

Next, the structures of the first light source unit 12 and the second light source unit 19 shall be described. FIG. 2 is a cross-sectional view of the first light source unit 12. The structure of the second light source unit 19 is identical to that of the first light source unit 12.

The first light source unit 12 comprises a substrate 30, a light-emitting element 31, a heat sink (thermal absorption plate) 32, a supporting member 33, a light source optical system 34, and a supporting member (lens holder) 35. One or more light-emitting elements 31 are provided on the substrate 30. Such light-emitting element 31 may be, for example, a white light emitting diode (LED). The substrate 30 includes a circuit board provided with interconnections for supplying power to the light-emitting element 31. A heat sink 32 for absorbing or releasing the heat from the first light source unit 12 is provided on the bottom surface of the substrate 30.

The light source optical system 34 is provided above the light-emitting element 31. The light source optical system 34 includes, for example, a planoconvex lens LN1, and a convex lens (biconvex lens) LN2. The planoconvex lens LN1 is supported by the supporting member 33 provided on the substrate 30, and the convex lens LN2 is supported by the supporting member 35 provided on the heat sink 32. The light source optical system 34 condenses the illumination light from the light-emitting element 31 and emits it unidirectionally. The illumination light that is emitted from the light source optical system 34 to the side of the liquid crystal panel is a surface light source.

[1-2] Structures of First Liquid Crystal Panel 14 and Second Liquid Crystal Panel 20

Figure 3:
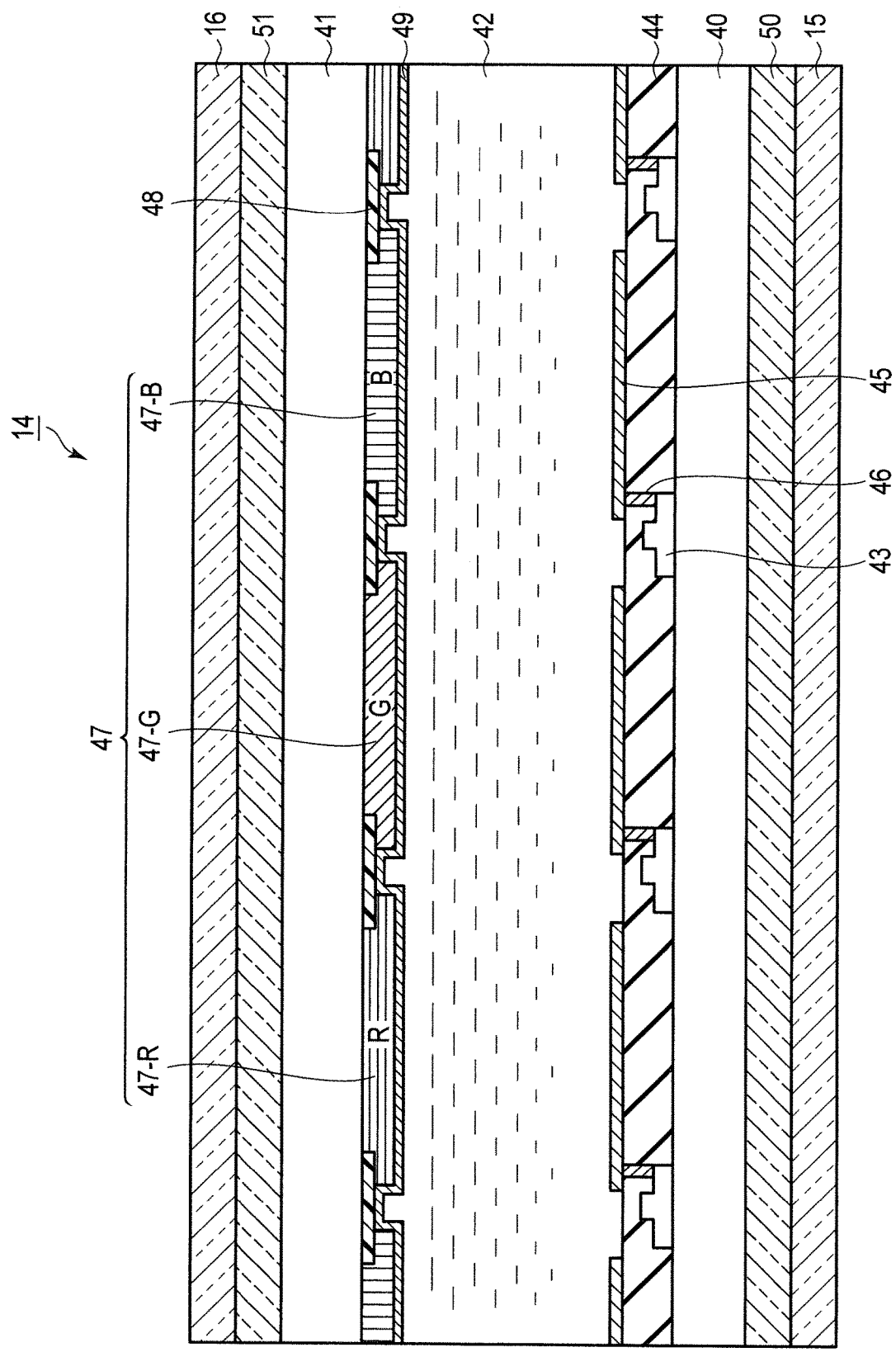
FIG. 3 is a cross-sectional view of a first liquid crystal panel.

Next, the structures of the first liquid crystal panel 14 and the second liquid crystal panel 20 shall be described. FIG. 3 is a cross-sectional view of the first liquid crystal panel 14. The structure of the second liquid crystal panel 20 is identical to that of the first liquid crystal panel 14.

The first liquid crystal panel 14 comprises: a TFT substrate 40 on which a TFT, a pixel electrode etc. are formed; and a color filter substrate (CF substrate) 41 on which a color filter, a common electrode etc. are formed and which faces the TFT substrate 40. Each of the TFT substrate 40 and CF substrate 41 is made from a transparent substrate (for example, a glass substrate or a plastic substrate). The TFT substrate 40 faces the back light and the illumination light from the back light enters the first liquid crystal panel 14 from the side of the TFT substrate 40. Among the two main faces of the first liquid crystal panel 14, the one main face on the opposite side from the back light is the display surface of the first liquid crystal panel 14.

The liquid crystal layer 42 is filled between the TFT substrate 40 and the CF substrate 41. More specifically, the liquid crystal layer 42 is enclosed in a region surrounded by the TFT substrate 40, the CF substrate 41, and a seal material (not shown). Whenever the orientation of the liquid crystal molecules is manipulated according to an electrical field applied between the TFT substrate 40 and the CF substrate 41, the liquid crystal material constituting the liquid crystal layer 42 changes its optical property.

The seal material includes, for example, a ultraviolet curable resin, a thermally-cured resin, a both ultraviolet curable and thermally-cured resin etc. After the seal material is applied onto the TFT substrate 40 and the CF substrate 41 during the manufacturing process, it is cured by ultraviolet irradiation or heating. In order to create a spacing (gap) of a predetermined value between the TFT substrate and the CF substrate, a gap material such as fiberglass or glass beads is dispersed in the seal material. Note that besides or instead of mixing the gap material into the seal material, the gap material may be disposed in the surrounding region located in the perimeter of the image display region.

A plurality of switching elements (active elements) 43 are arranged on the side of the liquid crystal layer 42 of the TFT substrate 40. Used as the switching elements 43 are, for example, TFTs (thin film transistors) or n-channel TFTs. A TFT 43 comprises a gate electrode functioning as a scanning line GL, a gate insulator film arranged on the gate electrode, a semiconductor layer (for example, an amorphous silicon layer) arranged on the gate insulator film, and a source electrode and drain electrode partially in contact with the semiconductor layer, separated from each other. The source electrode is electrically connected to the signal line SL.

An insulating layer 44 is provided on the TFTs 43. Pixel electrodes 45 corresponding to pixels are arranged on the insulating layer 44. Contact plugs (contact holes) 46 electrically connected to the pixel electrodes 45 are provided in the insulating layer 44 and on the drain electrodes of the TFTs 43.

A color filter 47 is provided on the side of the liquid crystal layer 42 of the CF substrate 41. The color filter 47 includes color filters (color members), and specifically red filters 47-R, green filters 47-G, and blue filters 47-B. Common color filters consist of the three primary colors Red (R), Green (G), and Blue (B). An adjacent set of filters of R, G and B colors functions as a unit of display (a pixel). Each of the single-color portions of one pixel is a minimum drive unit referred to as a subpixel (sub picture element). For every subpixel, a TFT 43 and a pixel electrode 45 are arranged. In the following description, subpixels shall be referred to as pixels except in the cases where a distinction between subpixels and pixels is necessary.

A black matrix (light shielding film) 48 for light shielding is arranged at the boundaries of the red filters 47-R, the green filter 47-G, and the blue filters 47-B, and at the boundaries of the pixels (subpixels). In other words, black matrix 48 is formed in a lattice pattern. The black matrix 48 is provided to shield, for example, any unnecessary light between the color members and improve the contrast.

A common electrode 49 is arranged on the color filter 47 and the black matrix 48. The common electrode 49 has a flat shape in the entire display region of the first liquid crystal panel 14.

A retardation plate 50 and the polarizer 15 are arranged on the side opposite to the liquid crystal layer 42 of the TFT substrate 40. A retardation plate 51 and the polarizer 16 are arranged on the side opposite to the liquid crystal layer 42 of the CF substrate 41. Note that in the case of the second liquid crystal panel 20, the polarizers 15, 16 shown in FIG. 3 are each replaced by the polarizers 21, 22.

The retardation plates 50, 51 have a refraction index anisotropy, and include a slow axis and a fast axis which are orthogonal to each other in the plane. The retardation plates 50, 51 have the function of providing a predetermined retardation (where $\lambda$ is defined as the wavelength of the passing light, the phase difference is $\lambda/4$) between the light of predetermined wavelength that has passed through the slow axis and the light of predetermined wavelength that has passed through the fast axis. In other words, the retardation plates 50, 51 consist of $\lambda/4$ plates. The slow axes of the retardation plates 50, 51 are arranged at approximately 45° to the transmission axes of the polarizers 15, 16.

Note that the aforementioned angles defining the polarizer and the retardation plate include errors enabling the desired operations and errors occurring during the manufacturing process. For example, the aforementioned angle of approximately 45° includes a range of 45°±5°, and the aforementioned orthogonal angle includes a range of 90°±5°.

The pixel electrodes 45, the contact plug 46, and the common electrode 49 are made of transparent electrodes, and used can be, for example, an indium tin oxide (ITO). A transparent insulating material can be used as the insulating layer 44, and used can be, for example, a silicon nitride (SiN).

[2] Operations of Head-Up Display Device 10

The operations of the head-up display device 10 having the above-described structure shall be described. FIG. 4 is a pattern diagram describing the operations of the head-up display device 10. In FIG. 4, the images 14A, 20A, and the virtual images 27, 28 are illustrated by the arrows. The "f" in FIG. 4 is the focal point of the concave mirror (reflecting member) 23, and the "o" in FIG. 4 is the center of curvature of the concave mirror 23. The center of curvature of the concave mirror is the center of the spherical face (circle of curvature) that is in contact with the pole (or vicinity of the pole) at which the optical axis and the concave mirror intersect.

In the case that the concave mirror 23 is used as the reflecting member, the first liquid crystal panel 14 and the second liquid crystal panel 20 are arranged between the concave mirror 23 and the focal point f of the concave mirror 23.

The first liquid crystal panel 14 displays the image 14A. The transmission axis of the polarizer 16 of the first liquid crystal panel 14 is parallel to the transmission axis of the reflective polarizer 17. In this manner, the display light from the first liquid crystal panel 14 passes the reflective polarizer 17 and reaches the driver 26. The driver 26 visually recognizes the display light from the first liquid crystal panel 14 as the virtual image 27.

Figure 5:
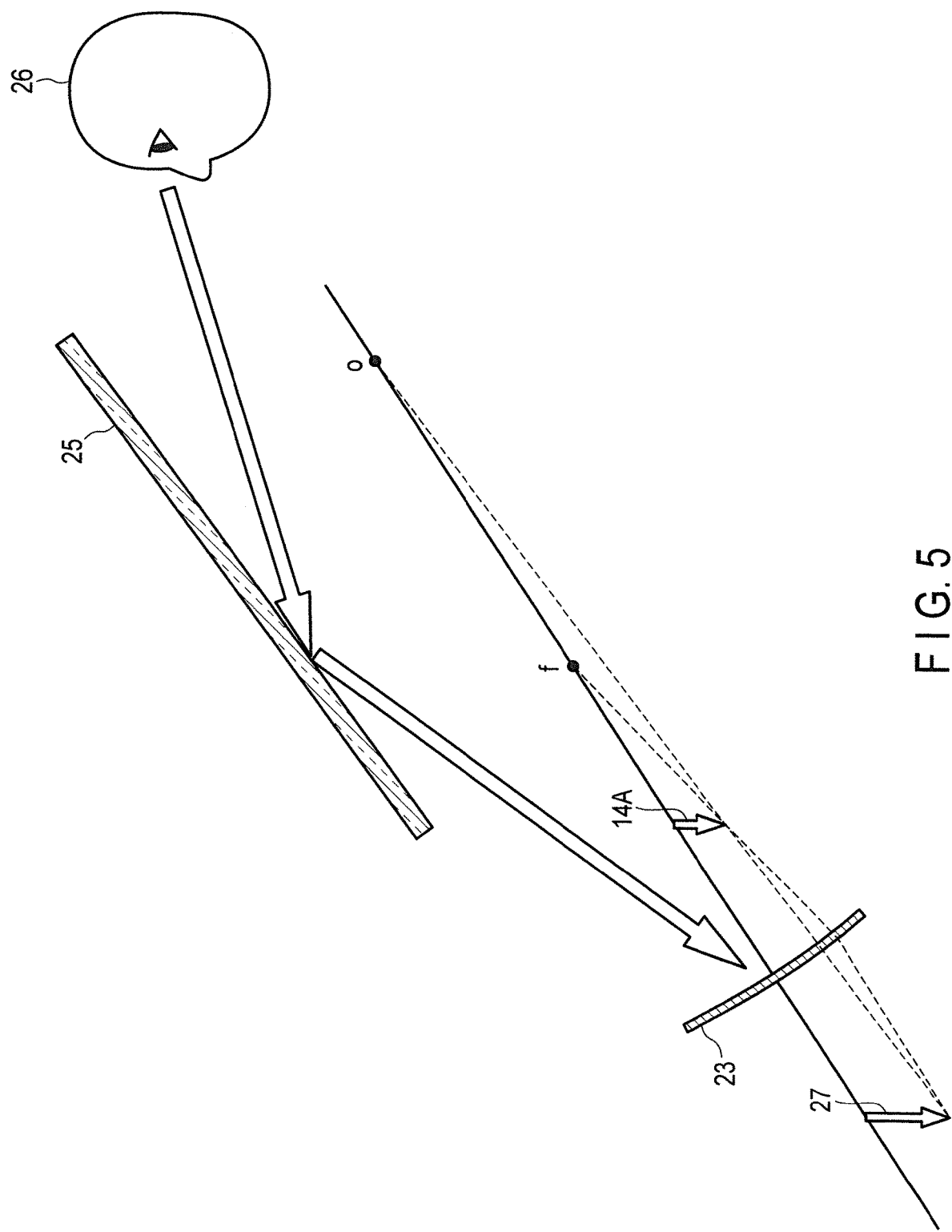
FIG. 5 is a pattern diagram specifically describing in detail how the driver visually recognizes the image of the first liquid crystal panel.

FIG. 5 is a pattern diagram describing in detail how the driver 26 visually recognizes the image 14A of the first liquid crystal panel 14. The driver 26 visually recognizes the image 14A projected onto the concave mirror 23 as the virtual image 27 on the window shield 25.

As shown in FIG. 4, the second liquid crystal panel 20 displays the image 20A. The transmission axis of the polarizer 22 of the second liquid crystal panel 20 is parallel to the reflection axis of the reflective polarizer 17. In this manner, the display light from the second liquid crystal panel 20 is reflected at the reflective polarizer 17 and reaches the driver 26. The driver 26 visually recognizes the display light from the second liquid crystal panel 20 as the virtual image 28. The way the driver 26 visually recognizes the virtual image 28 is the same as in FIG. 5.

The light path length from the second liquid crystal panel 20 to the concave mirror 23 is greater than the light path length from the first liquid crystal panel 14 to the concave mirror 23. Therefore, the virtual image 28 of the second liquid crystal panel 20 appears in a location further from the window shield 25 than the virtual image 27 of the first liquid crystal panel 14. The driver 26 can see the two virtual images 27, 28 in different locations.

As shown in FIG. 4, the distance from the concave mirror 23 to the virtual image 27 is the horizontal distance from the concave mirror 23 to the point at which the straight line L1 running through both the center of curvature o and the image 14A intersects with the straight line L2 extending in horizontal direction from the point at which the straight line running through both the focal point f and the image 14A reaches the concave mirror 23. Similarly, the distance from the concave mirror 23 to the virtual image 28 is the horizontal distance from the concave mirror 23 to the point at which the straight line L3 running through both the center of curvature o and the image 20A intersects with the straight line L4 extending in horizontal direction from the point at which the straight line running through both the focal point f and the image 20A reaches the concave mirror 23.

As shown in FIG. 1, after the display light from the first liquid crystal panel 14 and the second liquid crystal panel 20 passes the retardation plate 24, the light is irradiated onto the window shield 25. The display light from the first liquid crystal panel 14 and the second liquid crystal panel 20 includes two polarized light elements, in other words, a P-wave (polarized light P) and an S-wave (polarized light S) that have polarized light planes which are orthogonal to each other. The reflection ratios in the reflection planes of the polarized light P and of the polarized light S are different. Since the linearly polarized light is transformed into the circularly polarized light (or the elliptically polarized light) by the retardation plate 24, it is possible to decrease the difference in reflection ratio between the linearly polarized light emitted from the first liquid crystal panel 14 and the linearly polarized light emitted from the second liquid crystal panel 20 when the lights are reflected at the window shield 25.

[3] Effects of First Embodiment

As describes above in the first embodiment, the head-up display device 10 comprises the first light source unit 12; the first liquid crystal panel 14 configured to pass the light from the first light source unit 12; the reflective polarizer 17 that are arranged on the optical axis OA1 of the first light source unit 12, and includes both the first face receiving the light transmitting the first liquid crystal panel 14 and the second face on the side opposite to the first face; the second light source unit 19 configured to emit the light to the second face of the reflective polarizer 17; and the second liquid crystal panel 20 configured to pass the light from the second light source unit 19. The first liquid crystal panel 14 includes the polarizer 16 polarizing the light passing the liquid crystal layer, and the second liquid crystal panel 20 includes the polarizer 22 polarizing the light passing the liquid crystal layer. The optical axis OA1 of the first light source unit 12 is set at a slant to the normal of the reflective polarizer 17. The normal of the first liquid crystal panel 14 is set in parallel to the normal of the reflective polarizer 17. The optical axis OA2 of the second light source unit 19 is set at a slant to the normal of the reflective polarizer 17. The transmission axis of the polarizer 16 is set in parallel to the transmission axis of the reflective polarizer 17. The transmission axis of the polarizer 22 is set in parallel to the reflection axis of the reflective polarizer 17.

In the first embodiment, therefore, when the first liquid crystal panel 14 displays the image 14A and the second liquid crystal panel 20 displays the image 20A, it is possible to display the two virtual images 27, 28 in different locations. It is possible, for example, to display speed information needed for normal operation in the virtual image 27 that is near to the driver 26, and temporary information (risk-averting information, navigational information etc.) in the virtual image 28 that is far from the driver 26.

Moreover, it is possible to display the two virtual images 27, 28 in different locations without having to change the focal point distance of the optical system using the lens etc. In this manner, as it does not have a movable mechanism, the head-up display device 10 is more reliable. In addition, as it does not require any costly optical elements, the head-up display device 10 has a lower manufacturing cost.

The head-up display device 10 further comprises the retardation plate 24 configured to pass the light emitted from the first liquid crystal panel 14 and passing the reflective polarizer 17 and the light emitted from the second liquid crystal panel 20 and reflected at the reflective polarizer 17, and transform the linearly polarized light into the circularly polarized light or the elliptically polarized light. In this manner, it is possible to decrease the difference in reflection ratio between the linearly polarized light emitted from the first liquid crystal panel 14 and the linearly polarized light emitted from the second liquid crystal panel 20 when the lights are reflected at the window shield 25. As a result, it is possible to decrease the different in luminance between the virtual image 27 of the first liquid crystal panel 14 and the virtual image 28 of the second liquid crystal panel 20.

Second Embodiment

Figure 6:
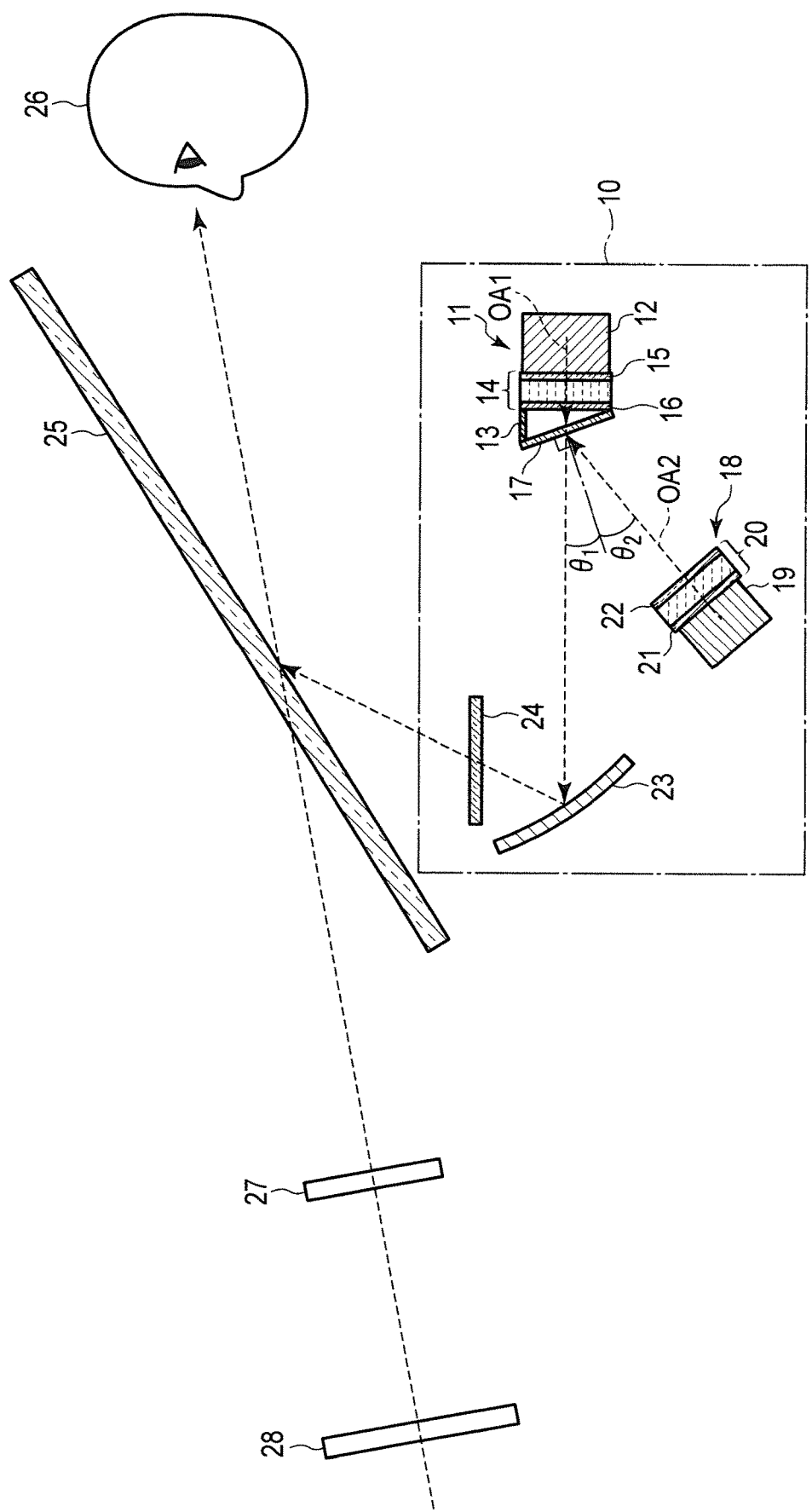
FIG. 6 is a cross-sectional view of a head-up display device according to a second embodiment of the present invention.

In a second embodiment, the first light source unit 12 and the first liquid crystal panel 14 are arranged in parallel, and the first liquid crystal panel 14 and the reflective polarizer 17 are arranged at a slant. FIG. 6 is a cross-sectional view of the head-up display device 10 in the second embodiment of the present invention.

The first liquid crystal display 11 comprises the first light source unit 12 and the first liquid crystal panel 14. The normal of the first liquid crystal panel 14 is arranged in parallel to the light path (optical axis) OA1 of the first light source unit 12. In other words, the display surface of the first liquid crystal panel 14 is parallel to the light-emitting surface of the first light source unit 12. The optical axis OA1 of the first light source unit 12 shown in FIG. 6 also indicates the normal of the first liquid crystal panel 14.

The supporting member 13 is in contact with the first liquid crystal panel 14 and the reflective polarizer 17, and fixes the first liquid crystal panel 14 and the reflective polarizer 17. The supporting member 13 fixes the first liquid crystal panel 14 and the reflective polarizer 17 in such way that the normal of the first liquid crystal panel 14 and the normal of the reflective polarizer 17 are at a slant. The angle between the normal of the first liquid crystal panel 14 and the normal of the reflective polarizer 17 is the same as angle $\theta_1$ mentioned in the first embodiment. The dashed-dotted line shown in FIG. 6 also indicates the normal of the reflective polarizer 17. The supporting member 13 is formed, for example, along the surrounding edge of the first liquid crystal panel 14, and consists of a rectangular frame in plane shape (when viewed in the plan view).

The angle $\theta_2$ between the normal of the reflective polarizer 17 and the optical axis OA2 of the second light source unit 19 is the same as in the first embodiment.

The relationships between the transmission axes of the polarizers 15, 16 in the first liquid crystal panel 14 and the transmission axis and reflection axis of the reflective polarizer 17 are the same as in the first embodiment. Similarly, the relationships between the transmission axes of the polarizers 21, 22 in the second liquid crystal panel 20 and the transmission axis and reflection axis of the reflective polarizer 17 are the same as in the first embodiment. In other words, the transmission axis of the polarizer 16 in the first liquid crystal panel 14 is set in parallel to the transmission axis of the reflective polarizer 17, and the transmission axis of the polarizer 22 in the second liquid crystal panel 20 is set in parallel to the reflection axis of the reflective polarizer 17.

Even where the structure of the head-up display device 10 is as shown in FIG. 6, the same operations as those in the first embodiment can be realized.

In the second embodiment, the illumination light from the first light source unit 12 enters the first liquid crystal panel 14 at right angle. In this manner, it can be prevented that the images at the first liquid crystal panel 14 deteriorate. The remaining effects are the same as those of the first embodiment.

Note that in the above embodiments, the head-up display device 10 was capable of causing two virtual images to appear. However, a third liquid crystal display or even more may be provided, and three or more virtual images may be caused to appear. Besides, the three liquid crystal displays were arranged within the focal point of the concave mirror as the reflecting member.

Note yet further that in the above embodiments, the second liquid crystal panel 20 was arranged at a slant below the reflective polarizer 17. However, as long as the direction in which the reflective polarizer 17 is tilted and the location of the second liquid crystal panel 20 are matched, the second liquid crystal panel 20 may be at any of: a slant below, a slant above, a slant to the left of, a slant to the right of etc. the reflective polarizer 17.

Note further that the terms "plate", "film" etc. in the present specification were used to exemplify the members. However, these members are not limited to the structures mentioned above. For example, the retardation plate is not limited to a plate-shaped member, and may be any film or other member possessing the capabilities mentioned in the present specification. Similarly, the polarizer is not limited to the plate-shaped member, and may be any film or other member possessing the capabilities mentioned in the present specification.

The present invention is not limited to the above-mentioned embodiments, and can be reduced to practice by modifying the constituent elements without departing from the spirit and scope of the invention. In addition, the above-described embodiments include inventions of various stages, and a variety of inventions can be derived by properly combining structural elements of one embodiment or by properly combining structural elements of different embodiments. For example, if the object of the invention is achieved and the advantages of the invention are attained even after some of the structural elements disclosed in connection with the embodiments are deleted, the structure made up of the resultant structural elements can be extracted as an invention.

What is claimed is:

1. A head-up display device comprising:
   a first light source unit;
   a first liquid crystal panel that includes a first liquid crystal layer configured to transmit a light from the first light source unit, and a first polarizer configured to polarize the light transmitting the first liquid crystal layer;
   a reflective polarizer that is arranged on an optical axis of the first light source unit, includes both a first face receiving the light transmitting the first liquid crystal panel and a second face on a side opposite to the first face, and includes both a transmission axis and a reflection axis;
   a second light source unit configured to emit a light towards the second face of the reflective polarizer; and
   a second liquid crystal panel that includes a second liquid crystal layer configured to transmit the light from the second light source unit, and a second polarizer configured to polarize the light transmitting the second liquid crystal layer, wherein
   the optical axis of the first light source unit is at a slant to a normal of the reflective polarizer,
   an optical axis of the second light source unit is at a slant to the normal of the reflective polarizer,
   a transmission axis of the first polarizer is parallel to the transmission axis of the reflective polarizer,
   a transmission axis of the second polarizer is parallel to the reflection axis of the reflective polarizer,
   the optical axis of the first light source unit and the normal of the reflective polarizer form an angle that is greater than 5° and less than 35°, and
   the optical axis of the second light source unit and the normal of the reflective polarizer form an angle that is greater than 5° and less than 35°.

2. The head-up display device according to claim 1, wherein a normal of the first liquid crystal panel is parallel to the normal of the reflective polarizer.

3. The head-up display device according to claim 2, further comprising a supporting member configured to fix the first light source unit and the first liquid crystal panel so that the optical axis of the first light source unit and the normal of the first liquid crystal panel are at a slant.

4. The head-up display device according to claim 2, wherein the reflective polarizer is adhered to the first liquid crystal panel.

5. The head-up display device according to claim 1, wherein a normal of the first liquid crystal panel is parallel to the optical axis of the first light source unit.

6. The head-up display device according to claim 5, further comprising a supporting member configured to fix the reflective polarizer and the first liquid crystal panel so that the normal of the reflective polarizer and the normal of the first liquid crystal panel are at a slant.

7. The head-up display device according to claim 1, further comprising a retardation plate that is configured to transmit the light emitted from the first liquid crystal panel and transmitting the reflective polarizer and the light emitted from the second liquid crystal panel and reflected at the reflective polarizer, and transforms a linearly polarized light into a circularly polarized light or an elliptically polarized light.

8. The head-up display device according to claim 7, wherein the retardation plate comprises a ¼ wavelength plate.

9. The head-up display device according to claim 1, further comprising a reflecting member that is configured to reflect the light emitted from the first liquid crystal panel and transmitting the reflective polarizer and the light emitted from the second liquid crystal panel and reflected at the reflective polarizer towards a display member.

10. The head-up display device according to claim 1; wherein
    the first liquid crystal panel further includes a third polarizer arranged on a side opposite to the first polarizer of the first liquid crystal layer, and
    the second liquid crystal panel further includes a fourth polarizer arranged on a side opposite to the second polarizer of the second liquid crystal layer.

* * * * *